US010605690B2

(12) United States Patent
Hamade

(10) Patent No.: US 10,605,690 B2
(45) Date of Patent: **\*Mar. 31, 2020**

(54) WEIGHT SPLITTING CONTROL SYSTEM

(71) Applicant: Dominion Technologies Group, Inc., Roseville, MI (US)

(72) Inventor: Abraham Hamade, Shelby Township, MI (US)

(73) Assignee: Dominion Technologies Group, Inc., Roseville, MI (US)

( \* ) Notice: Subject to any disclaimer, the term of this patent is extended or adjusted under 35 U.S.C. 154(b) by 422 days.

This patent is subject to a terminal disclaimer.

(21) Appl. No.: 15/340,245

(22) Filed: Nov. 1, 2016

(65) Prior Publication Data

US 2018/0120187 A1 May 3, 2018

(51) Int. Cl.
*G01M 1/22* (2006.01)
(52) U.S. Cl.
CPC ..................................... *G01M 1/22* (2013.01)
(58) Field of Classification Search
None
See application file for complete search history.

(56) References Cited

U.S. PATENT DOCUMENTS

| | | | | |
|---|---|---|---|---|
| 3,934,963 | A * | 1/1976 | Langlois | G01M 1/16 408/2 |
| 5,627,762 | A * | 5/1997 | Cameron | G01M 1/22 700/279 |
| 6,065,338 | A | 5/2000 | Stoiber et al. | |
| 2007/0267104 | A1 | 11/2007 | McGehee et al. | |

OTHER PUBLICATIONS

Grim et al. "Understanding the basics of balancing and measuring Techniques", Mar. 5, 2016, Accessed at web.archive.org/web/20160305000105/https://reliabilityweb.com/articles/entry/understanding_the_basics_of_balancing_and_measuring_techniques, 11 pages. (Year: 2016).*

\* cited by examiner

*Primary Examiner* — Suzanne Lo
(74) *Attorney, Agent, or Firm* — Harness, Dickey & Pierce, P.L.C.

(57) ABSTRACT

A measuring machine feeds imbalance data of the workpiece to a solution processor. The associated memory defines a model data structure to store the imbalance data and also store data indicative of the geometry of the workpiece, where the model data structure stores workpiece geometry data representing the location of at least one workpiece modification site, referenced to at least one predetermined reference frame. The solution processor is programmed to execute a solver program that seeks at least one solution to reduce the imbalance, using the model data structure as solver constraints. The solution processor outputs at least one solution as imbalance reduction data representing the location of at least one workpiece modification site together with a datum indicative of a weight to be added to or removed from the workpiece at the modification site. A workpiece modification machine has a workpiece modification processor that uses the output of the solution processor to control a machine that physically modifies the workpiece to reduce imbalance, by adding or removing material.

3 Claims, 7 Drawing Sheets

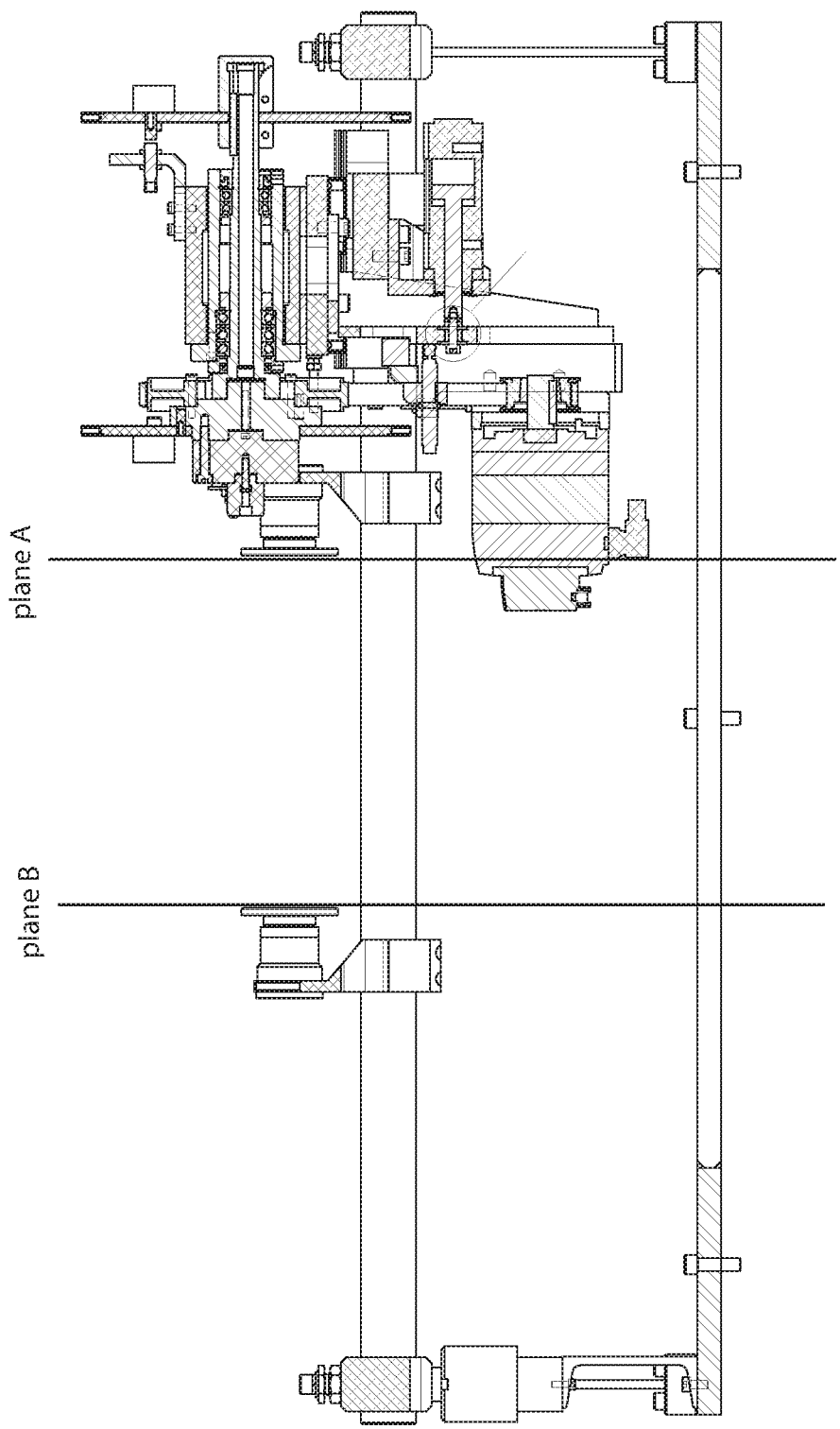

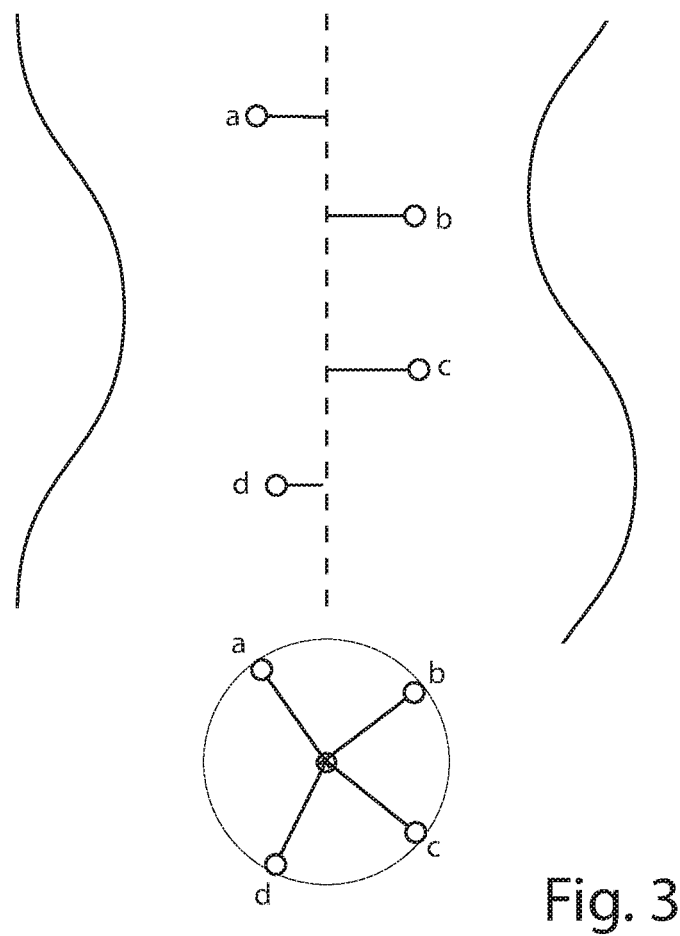
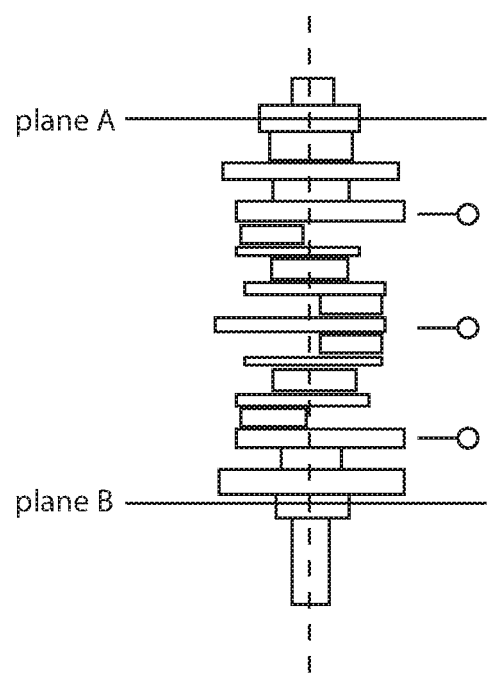
Fig. 3
Fig. 4

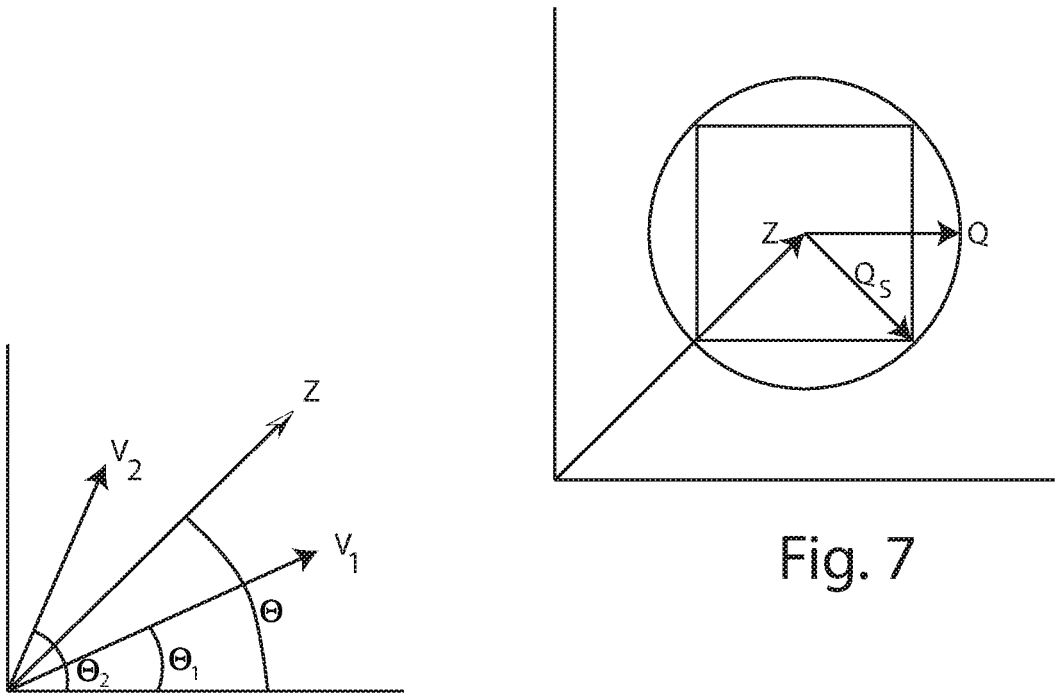
Fig. 7
Fig. 9
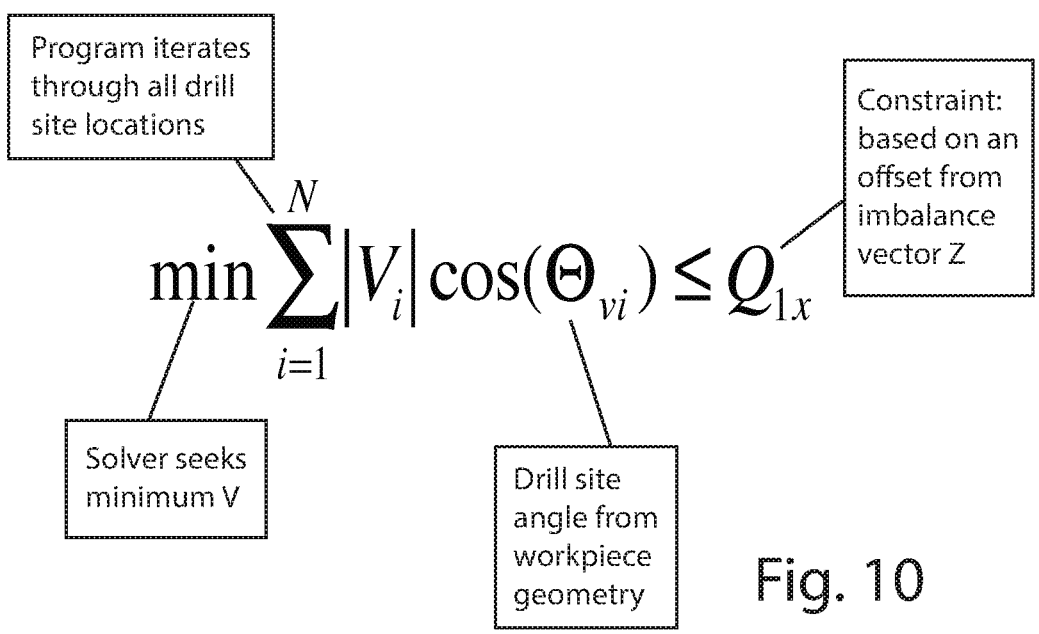
Fig. 10

WEIGHT SPLITTING CONTROL SYSTEM

FIELD

The present disclosure relates generally to balancing systems, such as balancing systems for balancing rotating members, including machine components such as axles, wheels, crankshafts, drive shafts, and the like.

BACKGROUND AND SUMMARY

This section provides background information related to the present disclosure which is not necessarily prior art. This section provides a general summary of the disclosure, and is not a comprehensive disclosure of its full scope or all of its features.

Correcting for imbalances in crankshafts or other rotating members has traditionally been somewhat of a trial and error process. Although it is possible to measure the overall imbalance of a rotating member, correcting for this imbalance by adding or subtracting weight at offsetting locations can be difficult because often there may be more than one solution for where to add or subtract material. Ideally, one would like to find an optimal solution that requires minimal invasive adding or subtracting of material. However, in conventional systems finding this optimal solution has proven difficult.

In the case of a crankshaft, for example, there are multiple sites radially disposed along the longitudinal axis. Each of these sites can potentially be used as drill sites from which to remove weight in order to offset an imbalance. However, a machinist has only his personal judgment regarding where to drill and how deep. The goal, of course, is to remove material to counteract the measured imbalance.

This is not as easy as it might appear at first blush. Because the crankshaft has a significant longitudinal dimension, drilling to offset a static imbalance can introduce dynamic imbalances. This is because a crankshaft, like other elongated rotating members, can exhibit vibration in multiple modes, just as a plucked string can vibrate at the primary frequency and also at integer multiples of the primary frequency. Thus drilling to remove the primary mode of imbalance or vibration could possibly introduce unwanted vibrations at higher order modes.

The disclosed weight splitting control system addresses solves the aforementioned difficulties in finding the optimal locations(s) for removing or adding material. Although drilling to remove material is described here, it will be understood that the solutions generated by the system can also be used to indicate where material may be added to achieve balance. Also, while drilling to remove material is disclosed here, other methods of removing material are also possible, including abrading, ablation, cutting, laser cutting, chemical etching and the like.

The disclosed weight splitting control system employs an apparatus for reducing imbalance in an elongated rotating workpiece, including a measuring machine receptive of the workpiece that outputs imbalance data for the workpiece. A solution processor having an associated memory is programmed to receive the imbalance data.

The associated memory is programmed according to a predefined model data structure to store the imbalance data and also store data indicative of the geometry of the workpiece, where the model data structure stores workpiece geometry data representing the location of at least one workpiece modification site, referenced to at least one predetermined reference frame.

The solution processor is programmed to execute a solver program that seeks at least one solution to reduce the imbalance, using the model data structure as solver constraints. The solution processor outputs at least one solution as imbalance reduction data representing the location of at least one workpiece modification site together with a datum indicative of a weight to be added to or removed from the workpiece at the modification site.

A workpiece modification machine receptive of the workpiece and having a workpiece modification processor uses the output of the solution processor to control a machine that physically modifies the workpiece to reduce imbalance.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a plan view of the measuring machine of FIG. 1A, illustrating the parallel reference planes;

FIG. 3 is a diagram useful in understanding the dynamic vibrational modes of an elongated workpiece;

FIG. 4 is a view of an exemplary crankshaft, showing potential drill sites;

FIG. 7 is a diagram illustrating a presently preferred model by which the processor of FIG. 5 is programmed;

FIG. 9 is a vector diagram useful in understanding the theory behind the general weight splitting concept; and FIG. 10 is a graphical depiction of one of the model constrains, with components labeled to aid in understanding how the data structure of the disclosed constraint model is configured in memory.

DESCRIPTION OF PREFERRED EMBODIMENTS

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Figure 1A:
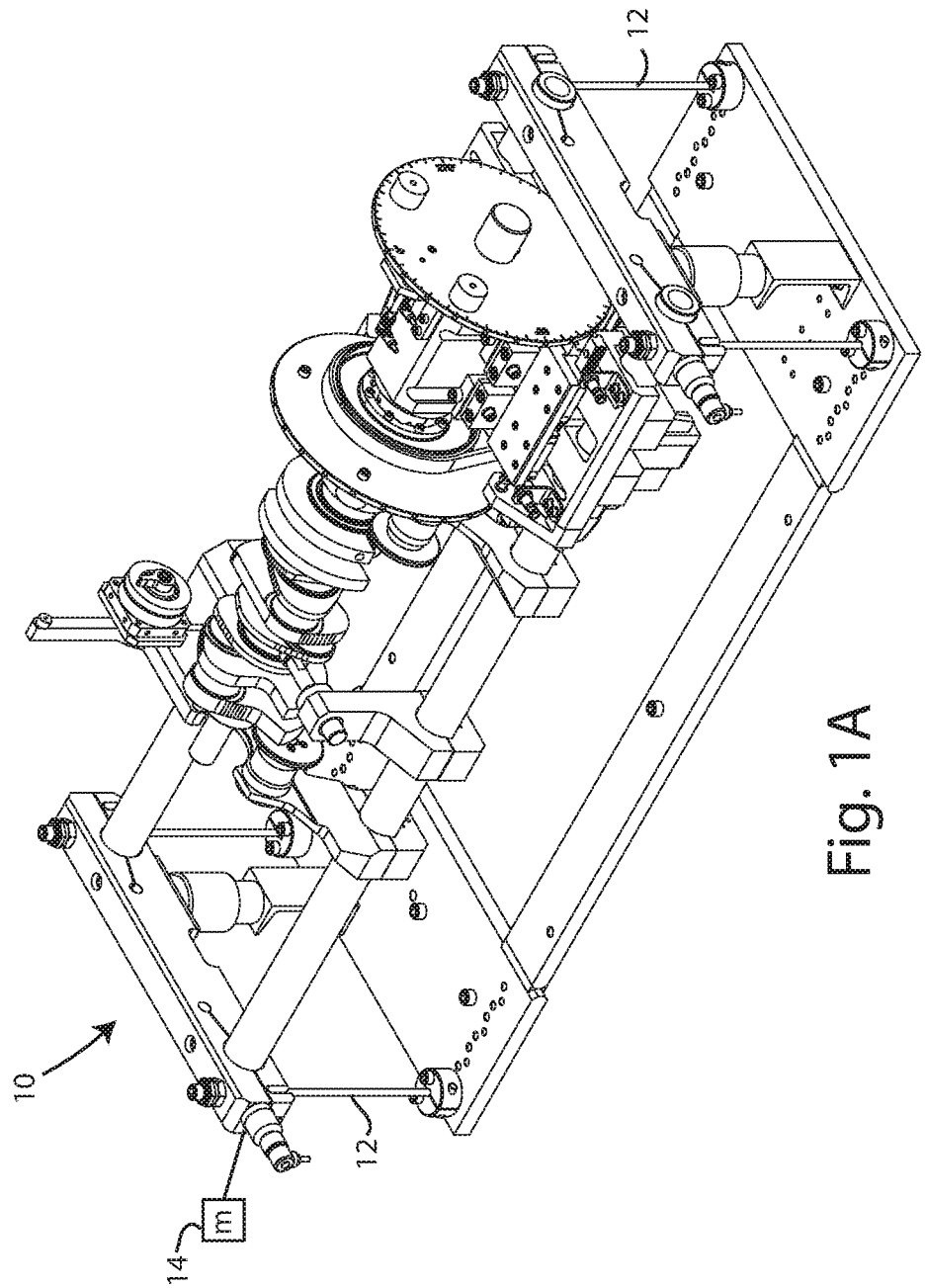
FIG. 1A is a perspective view of the measuring machine.
Figure 1B:
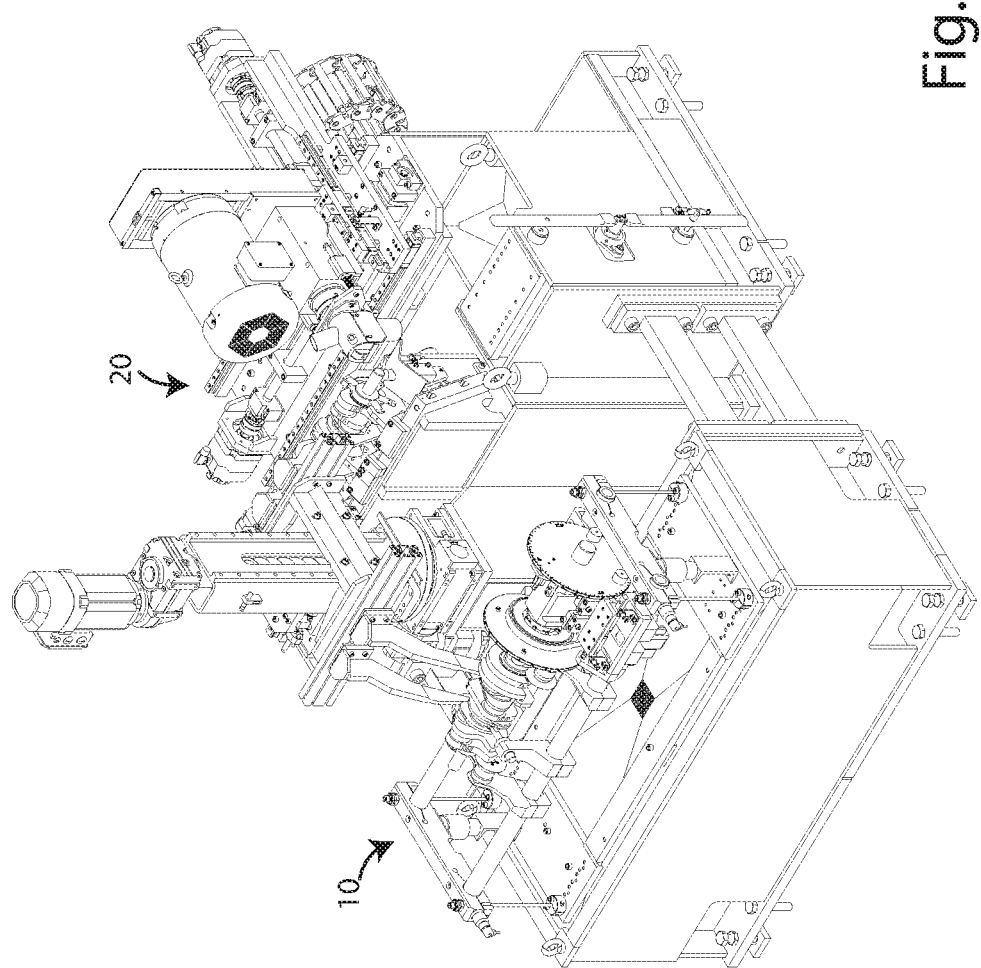
FIG. 1B is a perspective view of the measuring machine and drilling machine joined into a common assembly.

The weight splitting control system will be illustrated in conjunction with a measuring machine 10, shown in FIG. 1A, and a drilling machine 20 shown in FIG. 1B. The workpiece to be balanced will be illustrated as a crankshaft 30. The measuring machine is disposed on elongated rod-like legs 12 that allow the body of the measuring machine to vibrate as the workpiece is spun. Motion sensors 14 disposed in the body of the measuring machine provide electrical signals indicative of the vibrations exhibited by the measuring machine. Such vibrations occur when the workpiece (crankshaft 30) has an imbalance.

In the preferred embodiment, the measuring machine is calibrated with a test fixture or workpiece of known axial symmetry. During calibration the motion sensor signals are referenced to two parallel and spaced apart reference planes that orthogonally intersect the measuring machine's axis of rotation. These reference planes are shown in FIG. 2. Using two reference planes allows the motion sensors to provide dynamic data reflecting imbalances in a workpiece. That is, while a single reference plane would be sufficient to measure the first order vibrational mode of the workpiece, two reference planes also capture the second order vibrational mode. See FIG. 3, which illustrates these first and second vibrational modes. Because the workpiece is clamped at its ends, vibration is zero at the clamping points. Vibration reaches a single maximum in the first vibrational mode, as at 32; whereas vibration exhibits two maxima 34 in the second vibrational mode.

Drill Sites

The workpiece typically will have several different locations where material can be removed, as by drilling, to counteract any measured imbalance. In the exemplary crankshaft, shown in FIG. 4, there are N potential drill sites, where N is an integer number. For each of the N sites, the following values are determined and stored in memory:

radius
angle
axial location
maximum drill depth

FIG. 4 shows how these values are related. Essentially, the entry point of each drill site may be specified by a radius and an angle, measured from a common reference system to which the imbalance vector is also measured. The axial location corresponds to the location along the central axis of the crankshaft where the drill site is located. Thus the radius, angle and axial location specify a point in three dimensional space. The maximum drill depth is the depth beyond which the drill should not descend. This value is determined based on engineering strength of materials standards.

Processor

Figure 5:
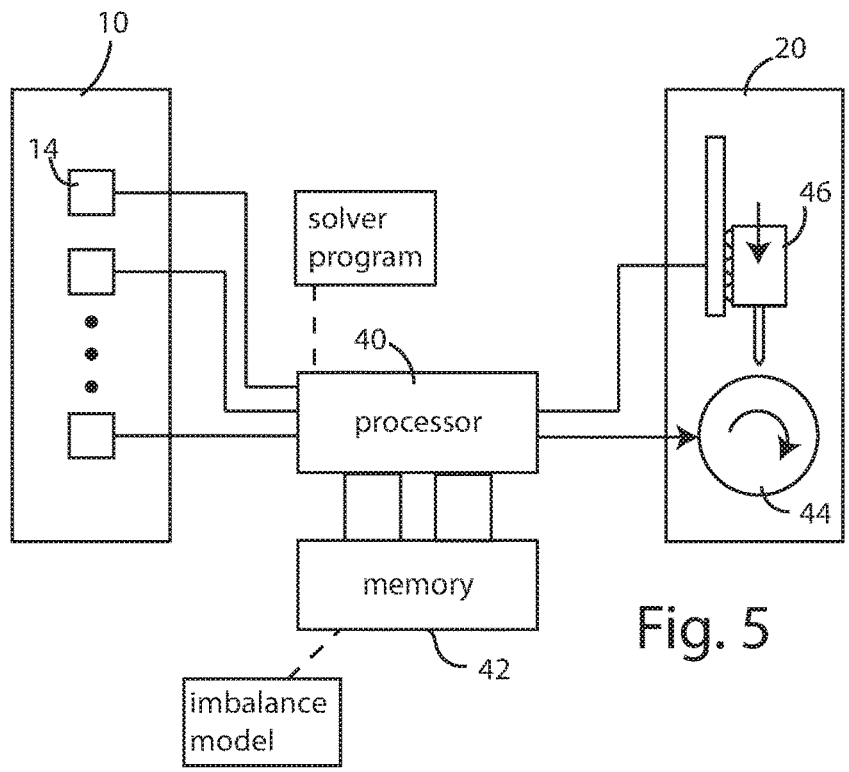
FIG. 5 is an electronic circuit diagram illustrating the processor-based circuit for calculating optimal drill data.

To determine the optimal drill sites and drill depths, the preferred embodiment uses an electronic circuit, shown in FIG. 5, that includes a processor 40 (e.g. microprocessor or computer) that has associated computer memory 42. The processor is programmed to perform a series of computational steps that determine the optimal drill sites and drill depths that will reduce the measured imbalance to substantially zero or to within a predefined range of substantially zero. The computed optimal drill sites and drill depths are fed as computed values to the drilling machine, which uses the computed values to robotically or automatically control an electrically activated workpiece rotator 44 to rotate the workpiece to the correct angle, whereupon an automated drill press 46 removes material to a certain calculated depth.

Figure 6:
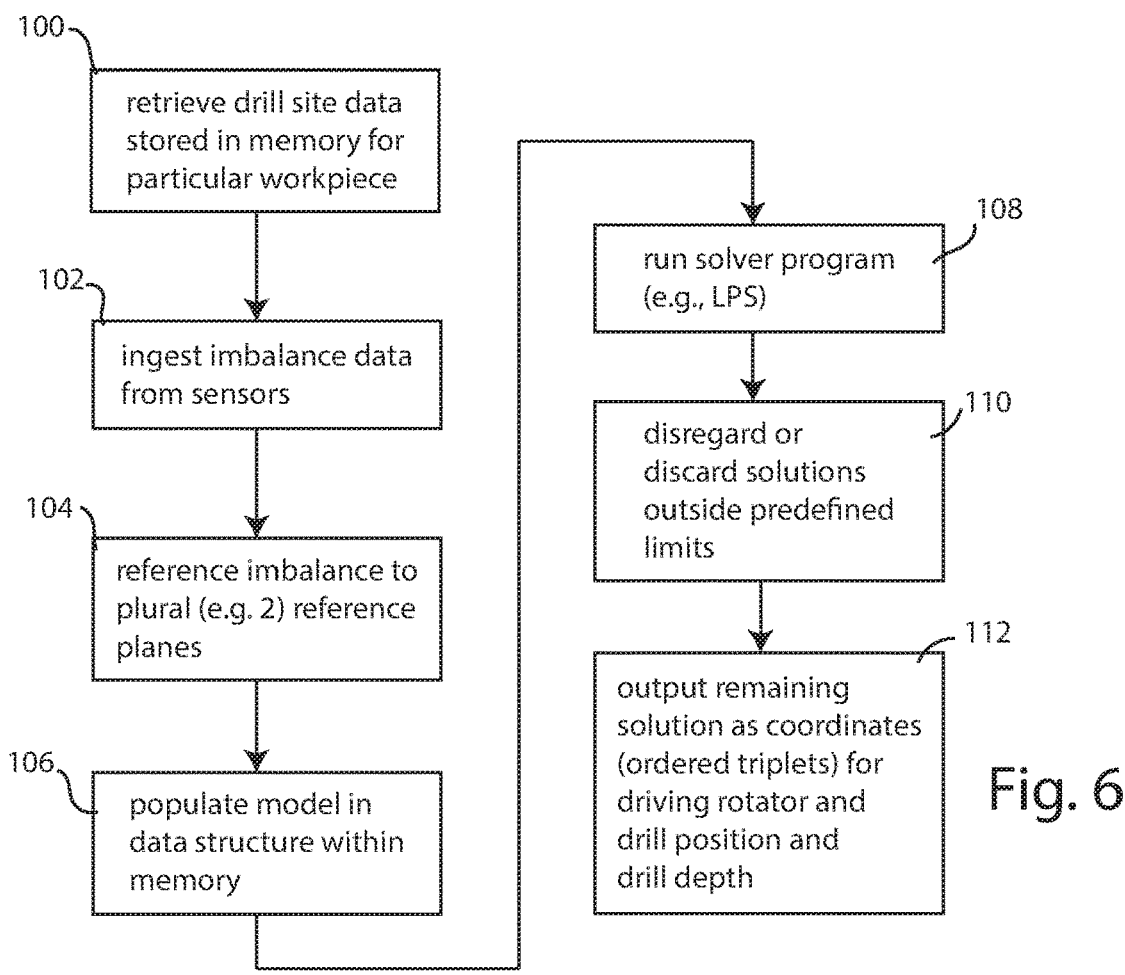
FIG. 6 is a flowchart diagram illustrating how the processor of FIG. 5 is programmed.

The processor is programmed according to the flowchart shown in FIG. 6. Prior to running the program shown in FIG. 6, a set of data are stored for the given workpiece to specify where the potential drill sites are physically located. These data specify: a radius, an angle, and an axial location for each potential drill site. These three values specify a unique point in three-dimensional space using a cylindrical coordinate system. See FIG. 4. If multiple different kinds of workpieces are to be balanced using the disclosed system, an array may be allocated in computer memory, to accommodate values for each different type of workpiece. Alternatively, these drill site data can be stored in a database, which the processor can query to retrieve the drill site data for the desired workpiece.

As shown in FIG. 6, the processor, at step 100, retrieves the drill site data for the particular workpiece and stores that data in memory for subsequent use in performing the described calculations. Next, at step 102, the processor ingests imbalance data from sensors 14. This can be done in real time, as the workpiece is being rotated on the measuring machine 10, or imbalance data can be collected ahead of time and then fed to the processor at step 102.

In the case where the data from sensors 14 represents raw vibrational data, the processor, at step 104, processes this data to obtain plural imbalance values, each corresponding to the imbalance measured with respect to a different reference frame. In the presently preferred embodiment two parallel reference frames are defined during calibration of the measurement machine 10. As discussed above, multiple separate planes are used, so that the system can measure and correct for first-order, second-order and potentially higher-order vibrational (imbalance) modes. Each imbalance measurement is a vector in weight-radius units, such as gram-centimeter units or the like.

In the preferred embodiment where two parallel reference planes are employed, two imbalance measurements are produced, one from the vantage point of the first parallel reference frame, and one from the vantage point of the second parallel reference frame. As will be discussed below, these two imbalance measurements are processed separately (in parallel) and are then distributed across the length of the workpiece on a ratio or percentage basis.

Once the imbalance data are ingested, the processor populates a predetermined data structure representing a model of the imbalance problem, as at step 106. A further discussion of the precise details of this model is provided below. Essentially, the model represents a series of constraints, expressed in a form suitable to be manipulated by a computational solver program. In the presently preferred embodiment, the processor performs a linear programming solver program. For this linear programming solver, the model represents a series of constraints expressed as algebraic statements that are populated with values obtained from the retrieved drill site data and from the imbalance measurements taken. Other types of solvers may also be used.

The processor runs the solver program, at step 108, resulting in the computational discovery of one or more solutions that satisfy all of the modeled constraints. In the presently preferred embodiment, solutions that are outside predefined limits are excluded, as shown at step 110. Specifically, solutions specifying negligible drill depth (e.g., a drill depth of zero to a few millimeters) are excluded. After such exclusion, a single optimal solution is obtained.

The optimal solution so obtained is fed to the drilling machine, as at step 112, where the values are exported as three-dimensional vectors or ordered triplets (angle, axial location, depth) used to position the workpiece, align the drill and control the drilling depth for each drill applicable site.

The Model

As will be explained in the Theory section below, the presently preferred model represents the imbalance relative to each of the two parallel planes separately. For each plane the imbalance is a vector quantity, measured in suitable units, such a gm-cm, oz-in, or the like. For explanation purposes here, the letter Z shall be used to represent such imbalance vector. In the presently preferred embodiment, there would actually be two such vector values, one for each parallel reference plane, thus $Z_1$ and $Z_2$. For simplicity, at this point of the discussion, only one vector Z shall be referred to, unless otherwise stated.

The objective of the solver program is to find the optimal set of offsetting drill site vectors to effectively negate the imbalance represented by Z. While it is theoretically possible to solve to fully offset the imbalance, in most practical applications it is sufficient, and less costly to offset the imbalance to a predefined tolerance. When represented in vector space, a predefined tolerance can be represented as a circle, with radius r, as shown in FIG. 7. From the solver's perspective, a circle represents a nonlinear problem that, while solvable, takes a lot of processor cycles. Therefore, to simplify the problem, the present embodiment uses an approximation of the circle corresponding to a regular polygon, inscribed within the tolerance circle. For illustration purposes, a square is disclosed here. As shown in FIG. 7 the inscribed polygon (e.g., square) represents approximations that all fall within the tolerance radius. Moreover, because the polygon (square) is made up of straight lines, this represents a linear problem for the solver.

Thus in place of the tolerance circle of radius r, the model defines constraints for the solver in terms of the vector positions (x, y positions) of the corners of the inscribed polygon (square). From FIG. 7 it will be appreciated that the (x, y) positions of the four corners of the inscribed square all correspond to offsets from the position of the imbalance vector Z. With this observation in mind, we can now turn to how the model represents the relationship between potential drill site locations and the imbalance vector Z.

Specifically, each drill site corresponds to a radius, an angle and an axial location, as discussed above. For explanation purposes here, the letter Vi shall be used to represent a drill site radius and $\Theta_{vi}$ shall be used to represent the drill site angle. The drill site angle for each drill site is known from the angular data retrieved and stored in memory at step 100, FIG. 6. The drill site radius corresponds to a drill depth, where the vector $V_i$ points to or terminates at the point where the drill bit stops. In sites that are not drilled, the vector $V_i$ simply points to the surface of the drill site in its non-drilled state.

Thus once the model data structure has been populated with measured values, the solver is solving to determine the drill depth for each site that requires drilling according to the optimal solution discovered by the solver. The following set of equation constraints represents the constraints needed to specify solutions falling within the inscribed square (tolerance zone) shown in FIG. 7. Note that this set of constraints uses N to represent the number of drill sites as referenced to one of the reference planes. In this case two reference planes are used, so another identical set of equation constraints will be defined and solved, for the other plane. In the equations below, V; is a vector quantity.

$$\min\Sigma_{i=1}^{N}|V_i| \cos \theta \le Q_{1x} \quad \text{(Eq. 1)}$$

$$\min\Sigma_{i=1}^{N}|V_i| \sin \theta \le Q_{1y} \quad \text{(Eq. 2)}$$

$$\min\Sigma_{i=1}^{N}|V_i| \cos \theta \le Q_{2x} \quad \text{(Eq. 3)}$$

$$\min\Sigma_{i=1}^{N}|V_i| \sin \theta \le Q_{2y} \quad \text{(Eq. 4)}$$

$$\min\Sigma_{i=1}^{N}|V_i| \cos \theta \le Q_{3x} \quad \text{(Eq. 5)}$$

$$\min\Sigma_{i=1}^{N}|V_i| \sin \theta \le Q_{3y} \quad \text{(Eq. 6)}$$

$$\min\Sigma_{i=1}^{N}|V_i| \cos \theta \le Q_{4x} \quad \text{(Eq. 7)}$$

$$\min\Sigma_{i=1}^{N}|V_i| \sin \theta \le Q_{4y} \quad \text{(Eq. 8)}$$

When the solver computes the solution to these constraints, it employs a solver algorithm that finds the minimum amount of drilling required to achieve a solution to this set of simultaneous equations. This can be understood from the fact that each constraint equation seeks the min iterative sum for each of the respective (x, y) square corner vector locations.

The presently preferred solver is a linear programming solver that utilizes the simplex technique, the details of which can be found in the literature. By way of implementation example, the Microsoft Foundation Solver may be used. However, it will be appreciated that a variety of different solvers can be used, so long as they can calculate a solution to the set of equation constraints outlined here.

The foregoing constraints are referenced to a particular reference plane. However, as will be appreciated from the example workpiece featured in FIG. 4, the potential drill sits are distributed longitudinally along the workpiece. In other words, each drill site has an axial location along the longitudinal axis of the workpiece. These locations are specified in the data retrieved in step 100, FIG. 6.

Figure 8:
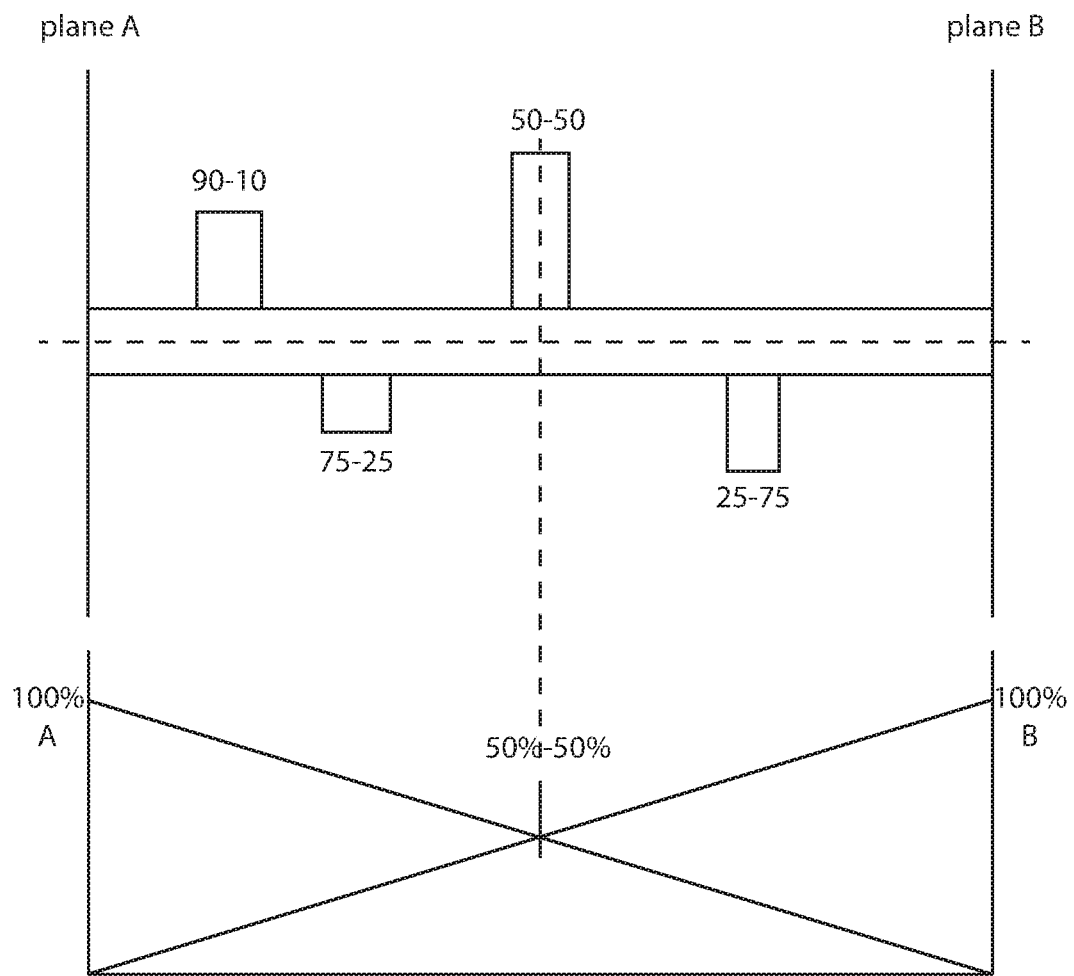
FIG. 8 is a diagram illustrating how the drill site solutions referenced to the respective first and second parallel planes are blended to distribute the solution across the longitudinal axis of the workpiece.

To take the axial location into account, the preferred embodiment uses a blending algorithm that assigns a drill depth for each drill site that is a blend of the resultant solver outputs using a percentage calculation that accounts for where each drill site happens to reside relative to each of the two parallel reference planes. As shown in FIG. 8 a drill site that lies fully within one reference plane receives a 100% contribution from the solver output for that reference plane. Likewise, a drill site that lies fully within the other reference plane receives a 100% contribution from the solver output for that other reference plane. A drill site that lies half-way between the two reference planes receives a 50% contribution from the solver outputs of each of the two reference planes. Other drill sites are computed proportionally in the same fashion.

Theory

The objective of the disclosed model and computer process is to find equivalent vectors $V_i$ that offset the imbalance vector Z. Consider for the moment a simple two-dimensional case where equivalent vectors $V_1$ and $V_2$ are selected to offset imbalance vector Z. Referring to FIG. 9, these equivalent vectors can be related by trigonometric relationships, using the respective angles, as illustrated. In FIG. 9 it will be understood that vectors $V_1$ and $V_2$ represent the vectors where drilling would be applied to offset the imbalance vector. Alternatively, weight can be added corresponding to vectors that are mirror images (180 degrees offset) of vectors $V_1$ and $V_2$.

Using the law of sines, the following relationships among $V_1$ and $V_2$ and Z can be expressed.

$$\frac{V_2}{\sin(|\theta - \theta_1|)} = \frac{V_1}{\sin(|\theta_2 - \theta|)} = \frac{Z}{\sin(180 - \theta_2 - \theta_1)}$$

Therefore, $$V_2 = Z \frac{\sin(|\theta - \theta_1|)}{\sin(|\theta_2 - \theta_1|)}$$

$$V_1 = Z \frac{\sin(|\theta - \theta_2|)}{\sin(|\theta_2 - \theta_1|)}$$

Weight splitting at N locations thus becomes a process of finding the absolute values of $V_1$, $V_2$, ... $V_N$ that are equivalent to Z, given Z and the respective angles $\theta_1$, $\theta_2$, ... $\theta_N$.

A general theorem of equivalence can be determined when the problem is resolved into Cartesian coordinates as follows.

$$|Z|\cos\theta_2 = \sum_{i=1}^{N} |V_i|\cos\theta_{vi}$$

$$|Z|\sin\theta_2 = \sum_{i=1}^{N} |V_i|\sin\theta_{vi}$$

This results in an infinite number of solutions. A constraint is required to narrow the solutions. Accordingly, we apply the following constraints, the former seeking the minimum value and the latter placing a lower limit $L_i$ and an upper limit $U_i$ to the solutions.

$$\min \sum_{i=1}^{N} |V_i|$$

$$0 > L_i \geq V_i \geq U_i$$

These constraints will minimize the total number of vectors required to reach Z.

In many practical applications it may not be necessary to exactly offset the imbalance vector Z. Rather, an acceptable tolerance range can be defined in terms of a quality radius Q, shown in FIG. 7. Thus the processor is programmed to find a solution that is anywhere within the acceptable region of Z, namely within the circle of radius Q.

In order to find a solution within a circle of radius Q, the solver will need to process nonlinear conditions, as the circle defines a curved, nonlinear locus. It is possible to solve such a nonlinear constraint using a nonlinear linear programming solver (NLPS). However, the processing cycle time required to perform the NLPS algorithm can be unacceptably long in some instances. Thus the disclosed embodiment employs a simplifying approximation that results in linear constraints that can be solved using a linear programming solver (LPS).

Specifically, the disclosed program process uses an inscribed polygon, in this case a square, to represent an approximation of the quality circle of radius Q. It will be appreciated that any solution that lies on any of the four sides of this square naturally fall within the acceptable radius Q. Indeed, the solutions correspond to the radius Q at the four vertices of the inscribed square. Elsewhere, the sides of the square represent better tolerance than defined by the circle of radius Q.

It will thus be appreciated that the model defined by Eq. 1-8 above are seeing to minimize the vector V associated with each of the four vertices of the inscribed square approximation. Note there are eight equations (Eq. 1-8) because each of the four vertices has an x-component and a y-component when represented in Cartesian coordinates. If a higher order polygon is used in place of the square, a correspondingly larger number of equations would be used to define the constraint model.

FIG. 10 shows one of the constraint model equations, with the equation elements labeled for better understanding.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An apparatus for reducing imbalance in an elongated rotating workpiece, comprising:

a measuring machine adapted to receive the workpiece and that outputs imbalance data for the workpiece, wherein the imbalance data is in a form of at least two vector values $Z_1$ and $Z_2$ relative to at least two parallel reference planes that lie perpendicular to the longitudinal axis of the workpiece;

a solution processor having associated memory and being programmed to receive the imbalance data;

the associated memory being programmed according to a predefined model data structure to store the imbalance data and also store data indicative of the geometry of the workpiece;

the predefined model data structure storing workpiece geometry data representing a location of at least two workpiece modification sites referenced to at least one predetermined reference plane that orthogonally intersects an axis of rotation of the measuring machine, wherein the predefined model data structure stores workpiece geometry data as cylindrical coordinate data representing the angular and axial location of the at least two workpiece modification sites;

the solution processor being programmed to execute a solver program utilizing a mathematical model that seeks at least one solution to reduce the imbalance, wherein the solution processor uses the predefined model data structure as solver constraints to minimize the amount of material removed, wherein the solution processor is programmed to calculate a solver solution for each of the two reference planes and to allocate proportional fractions of each solution according to the longitudinal position of the at least two workpiece modification sites within a predetermined tolerance modeled as a regular polygon inscribed within a quality circular radius Q defined by the imbalance data based upon the equation constraints $\min \Sigma_{i=1}^{N} |V_i| \cos \theta_{vi} \leq Q_{1x}$ $\min \Sigma_{i=1}^{N} |V_i| \sin \theta_{vi} \leq Q_{1y}$ $\min \Sigma_{i=1}^{N} |V_i| \cos \theta_{vi} \leq Q_{2x}$ $\min \Sigma_{i=1}^{N} |V_i| \sin \theta_{vi} \leq Q_{2y}$ $\min \Sigma_{i=1}^{N} |V_i| \cos \theta_{vi} \leq Q_{3x}$ $\min \Sigma_{i=1}^{N} |V_i| \sin \theta_{vi} \leq Q_{3y}$ $\min \Sigma_{i=1}^{N} |V_i| \cos \theta_{vi} \leq Q_{4x}$ $\min \Sigma_{i=1}^{N} |V_i| \sin \theta_{vi} \leq Q_{4y}$;

where $V_i$ represents a correction magnitude and $\Theta_{vi}$ represents the correction angle and N represents the number of correction sites as referenced to one of the reference planes and $Q_{1x}$, $Q_{1y}$, $Q_{2x}$, $Q_{2y}$, $Q_{3x}$, $Q_{3y}$, $Q_{4x}$, $Q_{4y}$ represent the vector positions of the corners of the regular polygon on radius Q;

the solution processor outputting the at least one solution as imbalance reduction data representing the location of at least two workpiece modification sites together with a datum indicative of a weight to be added to or removed from the workpiece at the at least two workpiece modification sites;

a workpiece modification machine adapted to receive the workpiece and having a workpiece modification processor that uses the output of the solution processor to control a machine that physically modifies the workpiece to reduce imbalance.

2. The apparatus of claim 1 wherein the at least two workpiece modification sites are correction sites and wherein the solver generates for each correction site a datum representing a correction amount via material removal or addition.

3. The apparatus of claim 1 wherein the predetermined tolerance is linearly modeled in said predefined model data structure.

* * * * *